US006190715B1

(12) United States Patent
Crowther et al.

(10) Patent No.: US 6,190,715 B1
(45) Date of Patent: Feb. 20, 2001

(54) PROCESS FOR PRODUCING EDIBLE QUALITY REFINED FISH OIL FROM MENHADEN, AND OTHER SIMILAR FISH CONTAINING OMEGA-3 LONG CHAIN FATTY ACIDS

(76) Inventors: Jane Bruce Crowther, P.O. Box 166, Reedville, VA (US) 22539; Bruce Howard Booth, 85 Bowsprit La.; Delois Demery Blackwell, 1089 Hull Neck Rd., both of Heathsville, VA (US) 22473

( * ) Notice: Under 35 U.S.C. 154(b), the term of this patent shall be extended for 0 days.

(21) Appl. No.: 09/452,417

(22) Filed: Dec. 1, 1999

(51) Int. Cl.[7] ........................................ A23D 9/02

(52) U.S. Cl. ....................... 426/330.6; 426/417; 426/478; 426/489; 426/643; 554/8

(58) Field of Search .................................. 426/643, 417, 426/330.6, 478, 489; 554/8

(56) References Cited

U.S. PATENT DOCUMENTS

| | | | |
|---|---|---|---|
| 57,427 | * | 8/1866 | Woodward . |
| 554,540 | * | 2/1896 | Sahlfeld . |
| 689,472 | * | 12/1901 | Edson . |
| 707,566 | * | 8/1902 | Edson . |
| 1,080,294 | * | 12/1913 | Overton . |
| 1,413,200 | * | 4/1922 | Thompson . |
| 1,840,715 | * | 1/1932 | Hiller . |
| 2,198,211 | * | 4/1940 | Musher . |
| 2,289,780 | * | 7/1942 | Heckman . |
| 2,303,740 | * | 12/1942 | Hempel . |
| 2,453,625 | * | 11/1948 | Harrison . |
| 2,473,453 | * | 6/1949 | Shropshire . |
| 2,497,367 | * | 2/1950 | Notevarp . |
| 2,536,345 | * | 1/1951 | Bradford . |
| 2,565,173 | * | 8/1951 | Fladmark . |
| 2,590,303 | * | 3/1952 | Fladmark . |
| 2,605,184 | * | 7/1952 | Osbourne . |
| 2,832,684 | * | 4/1958 | Sirnes . |
| 3,041,174 | * | 6/1962 | Ehlert . |
| 3,586,515 | * | 6/1971 | Anderson . |
| 3,882,238 | | 5/1975 | Quackenbush et al. . |
| 4,335,146 | * | 6/1982 | Bladh . |
| 4,389,423 | * | 6/1983 | Madsen . |
| 4,792,418 | | 12/1988 | Rubin et al. . |
| 4,874,629 | | 10/1989 | Chang et al. . |
| 4,913,921 | | 4/1990 | Schroeder et al. . |
| 4,915,876 | | 4/1990 | Lindsay . |
| 5,006,281 | | 4/1991 | Rubin et al. . |
| 5,023,100 | | 6/1991 | Chang et al. . |

(List continued on next page.)

FOREIGN PATENT DOCUMENTS

0298293 * 3/1994 (DE) .

*Primary Examiner*—Carolyn Paden

(57) ABSTRACT

A method for producing edible quality refined fish oil comprising the steps of extracting press liquor from a cooked fish, wherein the press liquor consists primarily of fish oil and water inherent in the cooked fish. The fish oil is from the group of fish consisting of menhaden, other similar fish, and mixtures thereof. Enzymes present in the press liquor are deactivated by injecting an acidic solution into said press liquor. After the fish oil is removed from the press liquor, the fish oil is cold filtered to produce an olein fraction and a stearine fraction. The stearine fraction is separated from the olein fraction and fatty acids that remain in the olein fraction are removed. Then bleaching the fish oil by mixing amorphous silica and diatomaceous earth with the fish oil, under vacuum conditions, and deodorizing the fish oil under vacuum conditions with steam injection. Finally, preparing the fish oil for storage by mixing a chelating agent and anti-oxidants with fish oil.

Also disclosed is a refined fish oil that is free of unsavory taste or smell, have an anisidine number of less than 6, and retain more than 98% of the omega-3 long chain fatty acids present in the natural unrefined fish oil.

27 Claims, 8 Drawing Sheets

U.S. PATENT DOCUMENTS 5,116,629 5/1992 Schroeder et al. .
5,374,446 12/1994 Ferenz et al. .
5,571,935 11/1996 Sekula et al. .
5,736,174 4/1998 Cooper et al. .
5,780,039 7/1998 Greenberg et al. .
6,020,020 * 2/2000 Cain .

* cited by examiner

PROCESS FOR PRODUCING EDIBLE QUALITY REFINED FISH OIL FROM MENHADEN, AND OTHER SIMILAR FISH CONTAINING OMEGA-3 LONG CHAIN FATTY ACIDS

BACKGROUND OF THE INVENTION

1. Field of the Invention

The present invention relates to an improved process for producing edible quality fish oil. More specifically, the present invention relates to an improved process for producing menhaden fish oil wherein the produced fish oil is edible, retains a high percentage of omega-3 long chain fatty acids, has improved storage stability, and has minimal oxidation.

2. Description of the Related Technology

Certain fish and other marine animals contain oil rich in polyunsaturated fatty acids, such as eicosapentaenoic acid (EPA) and docosahexaenoic acids (DHA). These fatty acids are referred to as omega-3 fatty acids. The positive health effects of consuming fish oil containing omega-3 fatty acids have been widely reported in recent years (U.S. Pat. No. 5,006,281, issued Apr. 9, 1991 to Rubin et al., U.S. Pat. No. 4,913,921 issued Apr. 3, 1990 to Schroeder et al., and U.S. Pat. No. 4,874,629 issued Oct. 17, 1989 to Chang et al.—incorporated by reference herein). These positive health benefits have been seen in humans and in animals. Unfortunately, untreated fish oils and more specifically fish oils high in omega-3 fatty acid content inherently have an unsavory fish odor and flavor. Furthermore, untreated fish oils high in omega-3 fatty acid are susceptible to oxidation. These fish oils after being oxidized will degrade after a period of hours, and diminish the omega-3 content of the fish oil. However, fish oils high in omega-3 fatty acids can be processed to remove the inherently unsavory fish odor and flavor, and to improve their stability and enhance their storage capability.

Unsavory odors and flavors in fish oils can be initiated by lipid peroxidation catalyzed by enzymatic activity, such as lipoxygenase, peroxidase, and cyclooxygenase. In order to produce an edible fish oil it is important to remove these enzymes and thus remove the unsavory fishy odor and taste from the fish oil.

Fish oil instability and degradation is caused by oxidation and peroxidation of the fatty acids in the fish oil. This is especially true of the omega-3 fatty acids found in oil from menhaden, salmon, sardine, anchovy, and cod. Further oxidation of the fish oil can occur by exposing the fish oil to oxygen, heat, or light.

Numerous processes have been proposed in the past to stabilize fish oils high in omega-3 fatty acids. Some processes involve deodorizing the fish oil by removing the naturally occurring amines present in the fish oil (volatiles) that emanate the "fishy" odor. Deodorizing typically involves steam stripping the fish oil with high temperature steam in a vessel or container to remove the volatiles. This method alone has proven unsuitable since high temperature (above 470° F.) removes or damages the omega-3 fatty acids. As noted above loss of the omega-3 fatty acids eliminates a large portion of the health benefit of the fish oil. Other methods suggested to protect the fish oil against oxidation involve adding anti-oxidants to the oil to protect the oil from subsequent oxidation. Simply adding anti-oxidants to the fish oil has failed to produce an edible fish oil suitable for long term storage since naturally occurring compounds in the fish oil, such as aldehydes, ketones, and carotenoids can seed peroxidation and must be removed to provide antioxidant effectiveness. Each of the aforementioned processes, while having some valuable effect, does little to the inherent oxidative nature of fish oil, and therefore little to improve the long term storage stability of the produced fish oil.

It is therefore desired to develop an improved process for refining an edible fish oil for long term storage such that the oxidative nature of the produced fish oil is reduced, the fish oil is protected against further oxidation, and other impurities in the fish oil are removed. It is imperative that only a small percentage of the omega-3 fatty acids be lost in the refining process. Moreover, the process for refining fish oil should be capable of plant production scale in addition to bench and pilot plant scales, to ensure maximum commercial application.

SUMMARY OF THE INVENTION

The present invention solves a number of the problems inherent in the prior art by providing a method for refining fish oil from cooked, pressed fish comprising first extracting press liquor from said cooked fish. The press liquor consists essentially of fish oil and water that is inherent in the cooked fish flesh. The pH of the press liquor is adjusted and the press liquor is separated into a fish oil component and a water component. The fish oil component consists of a homogenous mixture of stearine and olein. The pH of the press liquor is lowered so that the water component has a pH of less than 2. The low pH of the press liquor deactivates enzymes in the oil that accelerate the production of unsavory taste and smell.

After the enzymes are deactivated the fish oil is chilled, without any agitation, to crystallize the stearine. Once the stearine is crystallized it can be separated from the olein. Most of the fatty acids are removed from the cold filtered fish oil (olein) by injecting an aqueous alkali solution. The aqueous alkali solution converts the fatty acids into water soluble soaps, which can be separated from the cold filtered fish oil. Additional water, at a temperature greater than the cold filtered fish oil temperature, is injected into the cold filtered fish oil. The water is gently mixed with the cold filtered fish oil and any residual soaps that reside in the cold filtered fish oil are dissolved into the water. The water is then extracted from the cold filtered fish oil.

The cold filtered fish oil is bleached after the soaps and fatty acids are removed from the cold filtered fish oil. Bleaching occurs inside of a vacuum vessel where the cold filtered fish oil is heated and amorphous silica is mixed with the cold filtered fish oil. Then diatomaceous earth is mixed with the cold filtered fish oil to remove unwanted compounds that interfere with anti-oxidant addition. The cold filtered fish oil is then heated further and vacuum conditions are ceased by introducing an inert gas into the head space of the vacuum vessel. The cold filtered fish oil is then cooled and filtered to produce a bleached fish oil.

The bleached fish oil is then deodorized under vacuum. Deodorizing is accomplished by heating the bleached fish oil and slowly injecting steam into the bleached fish oil. The bleached fish oil is heated further and a steam sparge is applied to the bleached fish oil; at the optimum temperature oil quality is assessed (this includes checking for residual impurities). Once it is determined that residual impurities are no longer present; the bleached fish oil is cooled and a chelating agent is added to the bleached fish oil. The bleached fish oil is further cooled and a mixture of anti-oxidants is added to the oil to produce a deodorized fish oil.

The deodorized fish oil is then nitrogen blanketed and packaged for shipment.

Other and further features and advantages will be apparent from the following description of presently preferred embodiments of the invention, given for the purpose of disclosure and taken in conjunction with the accompanying drawings.

DETAILED DESCRIPTION OF THE PREFERRED EMBODIMENTS

Figure 1:
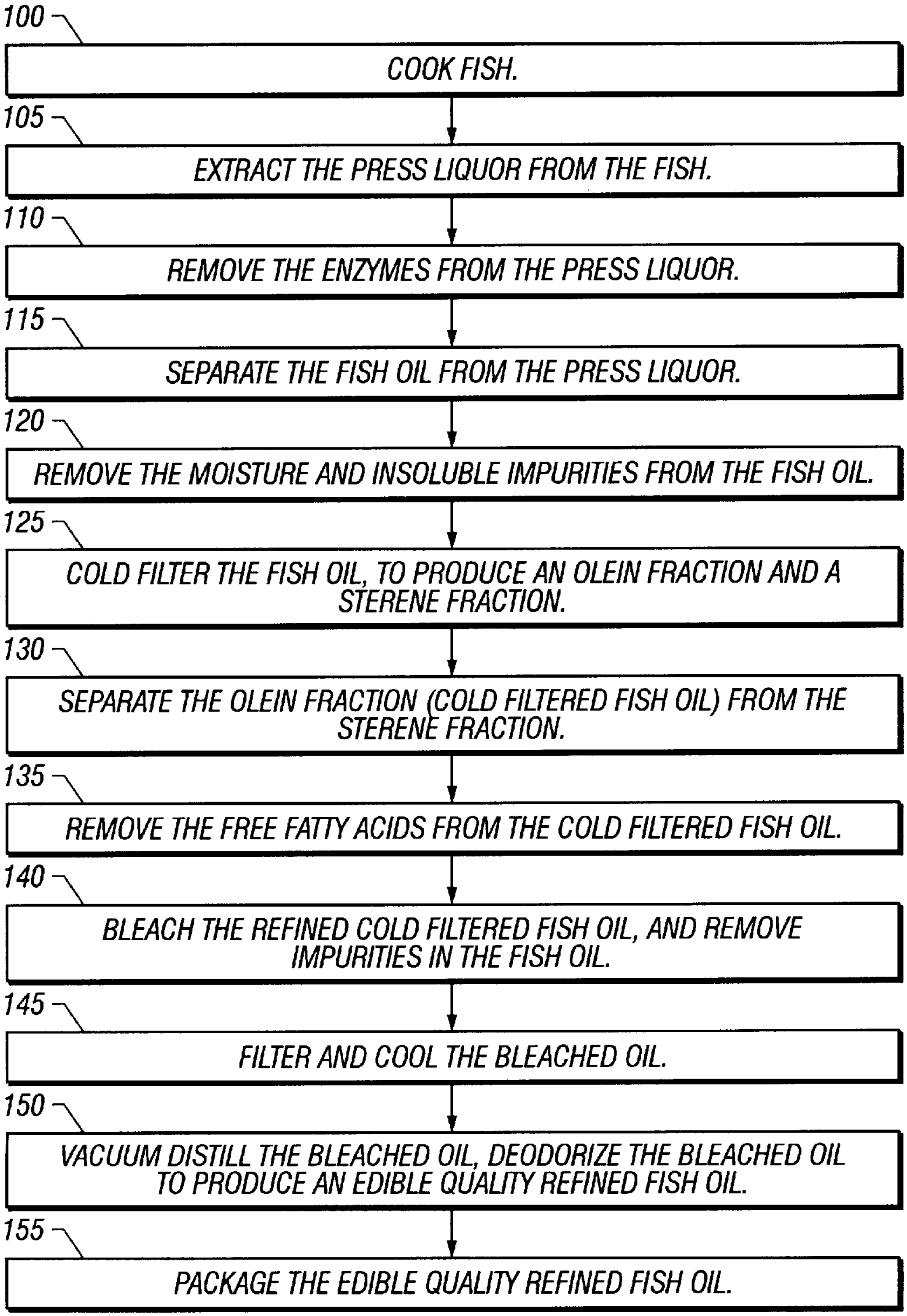
FIG. 1 is a flowchart of the method of the present process.
Figure 2:
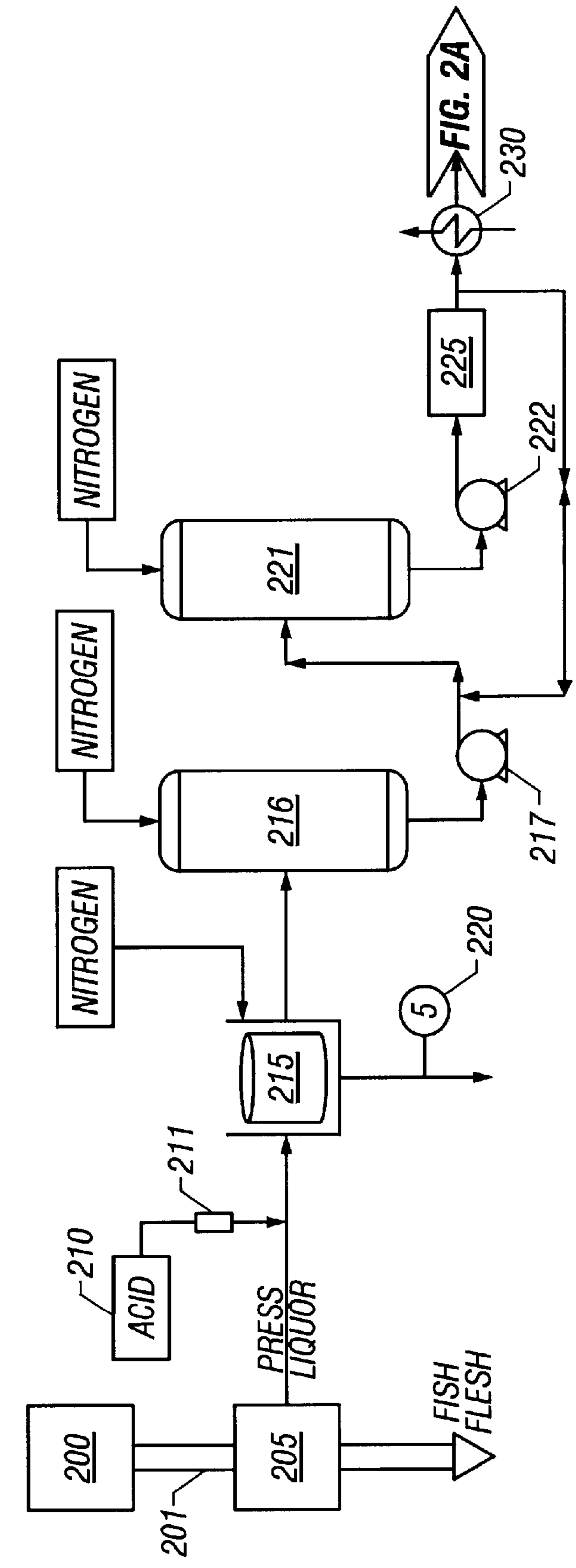
FIG. 2 is process flow diagram representing the wet rendering section of the present invention.

Referring now to the drawings, the details of preferred embodiments of the present invention are graphically and schematically illustrated. Like elements in the drawings will be represented by like numbers, and similar elements will be represented by like numbers with a different lower case letter suffix. Throughout the specification and claims, percentages are by weight and temperatures in degrees Fahrenheit, unless otherwise indicated. Referring now to FIG. 1, which illustrates the most preferred method of the present invention, the first step 100 through the fifth step 120 entail wet rendering the fish. The first step 100 involves cooking the fish. As illustrated in FIG. 2, the fish are processed through the cooker 200, (Renneburg brand) at a rate such that the temperature of the fish exiting the cooker 200 is 195° F. The second step 105 involves transferring the cooked fish flesh via a slew/conveyer to the press 205 (Stord, model MF64). Inside the press 205 the cooked fish are compressed to collect the fluids (the press liquor) present in the fish flesh. The press liquor primarily comprises fish oil and water inherent in the fish flesh.

When processing fish containing omega-3 fatty acids, such as menhaden fish, the fish oil contains enzymes such as lipoxygenase, peroxidase, and cyclooxygenase. This enzymatic activity can accelerate lipid peroxidation contributing to an oxidized flavor and odor of the resulting oil. Therefore, it is highly desirable to deactivate the maximum amount of enzymes as possible from the fish oil before the fish oil is packaged and stored. The enzymes in the press liquor are deactivated in the third step 110 by adding phosphoric acid 210 (85% food grade phosphoric acid) to the press liquor. The phosphoric acid 210 is added to the press liquor after the press liquor has exited the press 205. After the phosphoric acid 210 is added to the press liquor the acidified press liquor is directed to the acid centrifuge 215. The fourth step 115 involves using the acid centrifuge 215 to separate water and the added phosphoric acid 210 from the fish oil. The pH of the water and phosphoric acid 210 extracted from the fish oil is monitored at the pH sample point 220. The phosphoric acid 210 flow rate is adjusted to maintain a pH of less than 2 of the water and phosphoric acid 210 extracted from the fish oil. The phosphoric acid 210 flow rate is maintained via the acid metering pump 211. To ensure controllability it is preferred that the acid metering pump 211 be a Durcometer Diatube II. After exiting the centrifuge the fish oil is directed to the quality control tank 216 where quality control tests are performed on the fish oil. The quality control tests measure free fatty acid, peroxide value, anisidine number, and iodine value. The quality control requirements are free fatty acid value less than 2%, peroxide value less than 5 meq/kg, anisidine number less than 15 and iodine value greater than 165. Once the fish oil meets the quality control requirements the fish oil is pumped via the quality control tank pump 217 to the packed bed tank 221. The fish oil is subjected to a nitrogen blanket from the acid centrifuge 215 to the quality control tank 216, and onto the packed bed tank 221.

The fish oil is pumped from the packed bed tank 221 by the packed bed pump 222 through the soda ash packed bed 225 (containing soda ash-calcined). Filtering the fish oil through the soda ash packed bed 225 reduces moisture and insoluble impurities from the fish oil and prepares the fish oil for subsequent clarification. Insoluble impurities consist of dirt, meal, and other foreign substances that do not dissolve in ether. To initiate the soda ash packed bed 225 a feedback loop 226 is provided to recycle the fish oil through the packed bed tank 221.

Figure 2A:
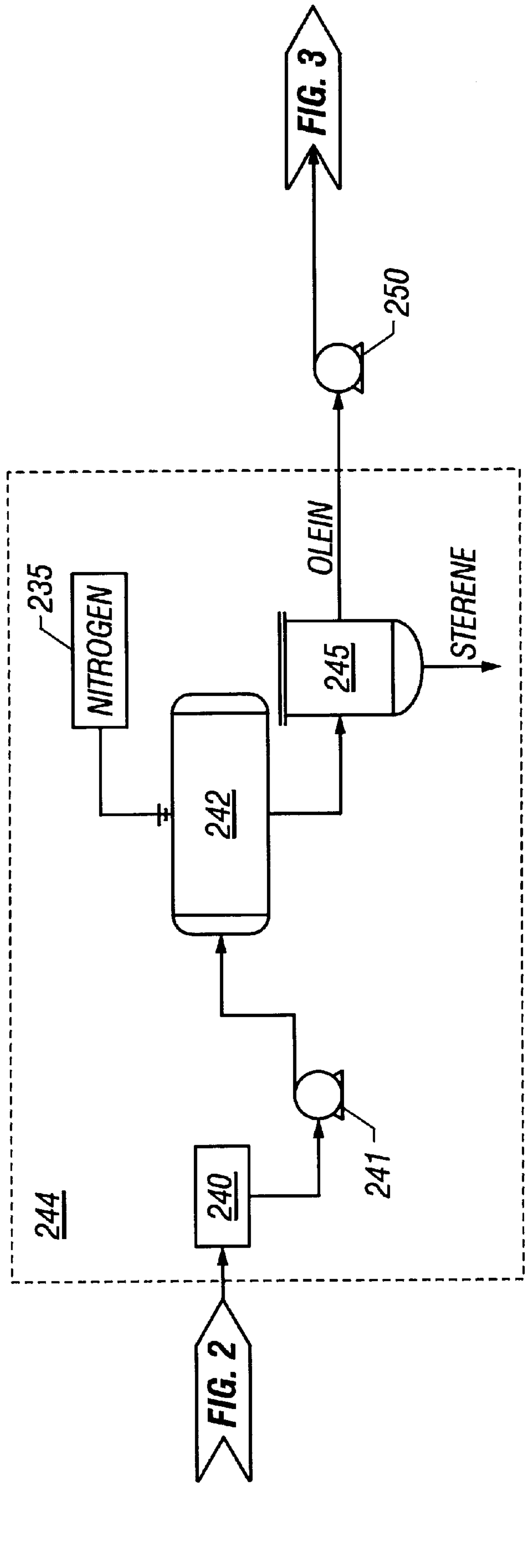
FIG. 2*a* is a process flow diagram representing the cold filtration section of the present invention.

Steps six 125 and seven 130 involve processing the fish oil via cold filtration (traditionally referred to as winterization). At this point in the process the fish oil is comprised of a homogenous mixture of two main fractions, a stearine fraction and an olein fraction. During cold filtration the fish oil temperature is reduced until the stearine fraction of the fish oil crystallizes (step six 125)—the olein fraction remains in the liquid state. After the stearine has fully crystallized the olein fraction is separated from the stearine fraction (step seven 130). The first step of the cold filtration process involves passing the fish oil flowing out of the soda ash packed bed 225 through the wet rendered fish oil cooler 230. After being cooled to 120° F. by the wet rendered fish oil cooler 230 the fish oil is pumped to the cold filtration settling tank 240 (FIG. 2*a*) where the fish oil is cooled further. Cooling inside of the cold filtration settling tank 240 occurs by cooling the area inside the boundary line 244. While many cooling scenarios exist, the preferred cooling arrangement is attained whereby the boundary line 244 is a large insulated room, or series of insulated rooms, in which the cold filtration equipment is situated. The cold filtration equipment consists of the cold filtration settling tank 240, the cold filtration pump 241, the cold filtration pressure tank 242, and the olein/stearine filter 245. Therefore, cooling the area inside of the boundary line 244 cools the cold filtration equipment, thus cooling the fish oil inside of each piece of cold filtration equipment. Stearine will begin to crystallize at about 90° F.; but once the temperature of the fish oil inside of the cold filtration settling tank 240 is stabilized at between 40° F.–42° F., a substantial portion of the stearine fraction of the fish oil will have crystallized.

Crystallized fish oil, and more specifically crystallized menhaden fish oil is very fragile and care must be taken during handling to not incur high shear forces or heat upon the crystallized fish oil. High shear forces or excessive perturbations create heat and destroy the crystal structure of the crystallized fish oil; thus making separation of the stearine fraction from the olein fraction difficult. To protect the stearine fraction the cold filtration pump 241 (Wilden M15 air operated diaphragm pump) is used to pump the crystallized stearine/liquid olein from the cold filtration settling tank 240 to the cold filtration pressure tank 242. Other types of pumps, such as centrifugal, reciprocating, or positive displacement pumps typically transmit such high shear forces, heat, or perturbations that the stearine crystals will be destroyed. If the stearine crystals are damaged it is difficult to separate the stearine from the olein. A nitrogen blanket is supplied to the cold filtration pressure tank 242 via the cold filtration nitrogen supply 235. The nitrogen added to the cold filtration pressure tank 242 protects the fish oil from oxidation and provides positive pressure to the cold filtration pressure tank 242. A positive pressure inside of the cold filtration pressure tank 242 is needed to force the olein/stearine mixture through the olein/stearine filter 245. The cold filtration pressure tank 242 is kept under a nitrogen blanket from the cold filtration nitrogen supply 234. In addition to maintaining pressure inside of the cold filtration pressure tank 242 for filtration purposes, the nitrogen blanket and also excludes oxygen leakage into the cold filtration pressure tank 242. It is preferred that the olein/stearine filter 245 be comprised of polypropylene plates and fitted with polyester filter cloths.

One of the advantages of the novel chilling process described above is that no agitation is employed when chilling the fish oil. Perturbations of the fish oil not only disrupt stearine crystal growth and stability, but also increase the risk of adding oxygen to the oil. Oxygen can degrade and destabilize the fish oil. The methods of cooling the area inside of the boundary line 244 depend upon on size of the cold filtration equipment, the size and ambient environment where the boundary line 244, and where the cold filtration equipment are located. However, it is appreciated that one skilled in the art can ascertain an adequate cooling method.

Almost all of the omega-3 fatty acids present in the unprocessed fish oil remain in the olein fraction. Accordingly, after separating the olein fraction from the stearine fraction the olein fraction (cold filtered fish oil) is directed to the remaining portions of the refining process for ultimate human consumption; while the stearine fraction is processed for use as animal feed stock and other agricultural fat blends.

Figure 3:
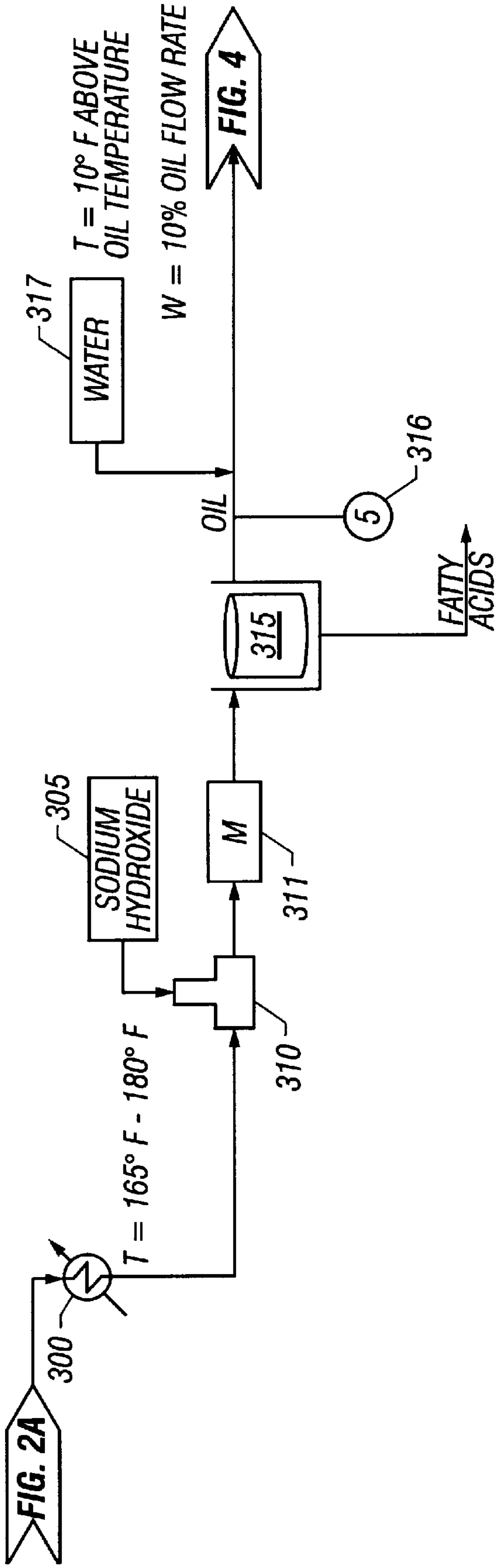
FIG. 3 is a process flow diagram representing the initial stage of the free fatty acid reduction section of the present invention.
Figure 4:
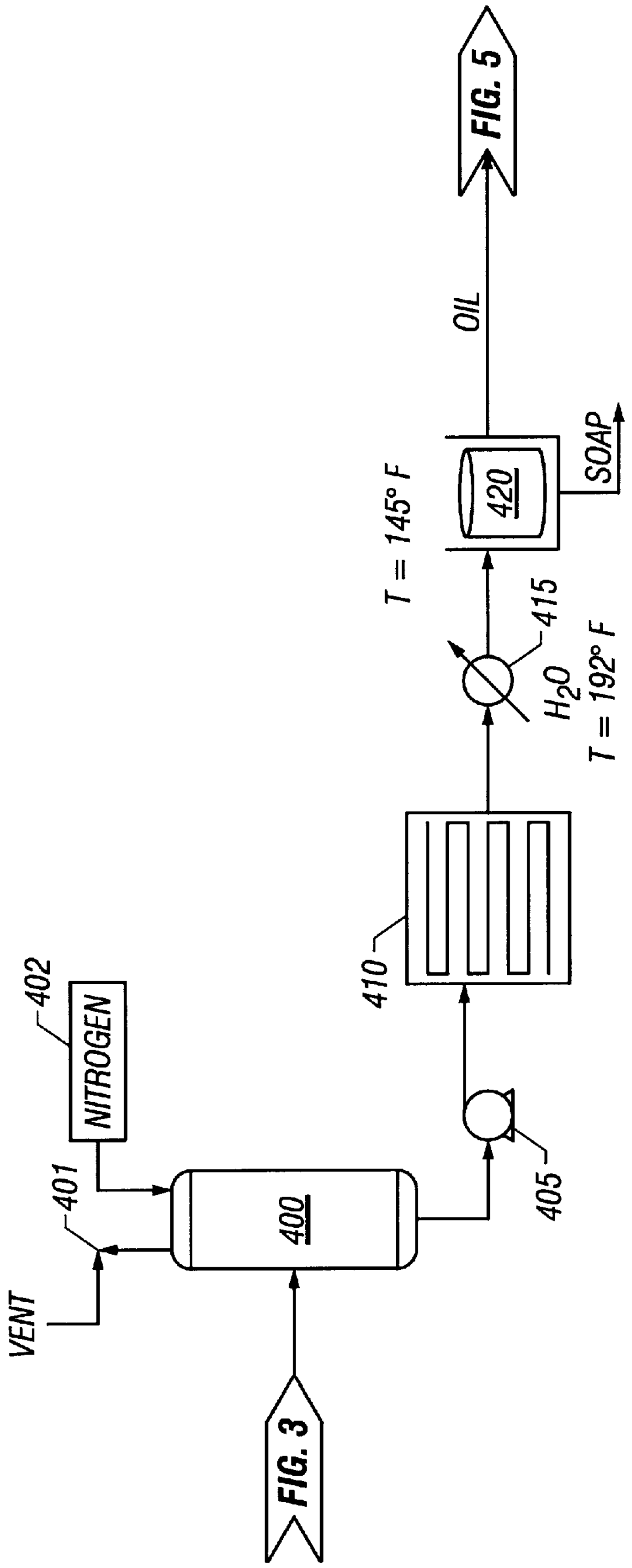
FIG. 4 is a process flow diagram representing the final stage of the free fatty acid reduction section of the present invention.

The eighth step 135 of the present invention involves removing the free fatty acids from the cold filtered fish oil. After leaving the olein/stearine filter 245 the cold filtered fish oil is directed to the cold filtered oil heater 300 (FIG. 3) by the olein pump 250. The cold filtered fish oil is heated to a range of 165° F. to 180° F. by the cold filtered oil heater 300 and injected with sodium hydroxide 305 via a mixing tee 310. The added sodium hydroxide 305 makes most of the undesirable fatty acids in the fish oil water soluble. The cold filtered fish oil with the added sodium hydroxide 305 then flows through a static mixer 311 (Chemaneer) and on to the primary fatty acid centrifuge 315 (Alfa Laval, model SRG 509). The remaining fatty acids present in the cold filtered fish oil exiting the primary fatty acid centrifuge 315 can be sampled at the fatty acid sample point 316. The primary fatty acid centrifuge 315 reduces the fatty acid content of the cold filtered fish oil from about 1.5% by volume to about 0.02% by volume. However residual soaps that still reside in the cold filtered fish oil can hydrolize and increase the fatty acid content in excess of 0.07% by volume. To remove the residual soaps elevated temperature water 317 is added to the cold filtered fish oil exiting the primary fatty acid centrifuge 315. The temperature of the elevated temperature water 317 ranges from 10° F. to 20° F. greater than the temperature of the cold filtered fish oil. The elevated temperature water 317 flow rate ranges from 10% to 15% by weight of the cold filtered fish oil flow rate. The preferred temperature of the elevated temperature water 317 is 10° F. above the temperature of the cold filtered fish oil, and the preferred flow rate of the elevated temperature water 317 is 10% of the cold filtered fish oil flow rate. The cold filtered fish oil and water mixture then flows to the receiving tank 400 (FIG. 4). The receiving tank 400 is under continuous nitrogen blanket from the receiving tank nitrogen addition 402; excess gas from the receiving tank is vented through the receiving tank vent 401. The cold filtered fish oil and water mixture is pumped from the receiving tank 400 by the mixing loop pump 405 to the mixing/retention loop 410.

Figure 6:
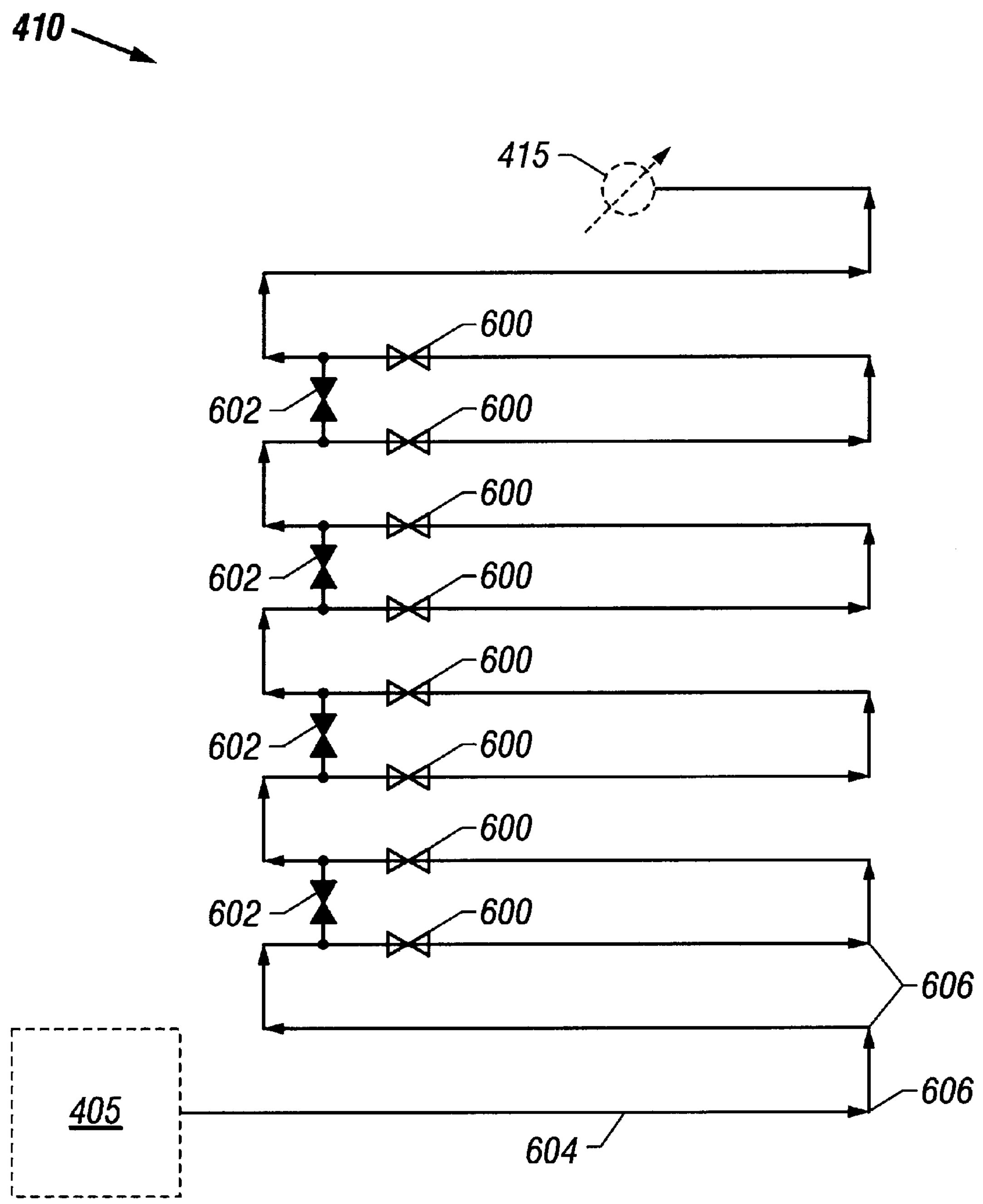
FIG. 6 is a piping diagram illustrating the mixing/retention loop of the present invention.

The mixing/retention loop 410 is comprised of a length of mixing loop piping 604 (FIG. 6) having multiple elbows 606. As mentioned above, residual soaps remain in the cold filtered fish oil and water mixture at this stage of the process. Flowing through the mixing loop piping 604 and the multiple elbows 606 of the mixing/retention loop 410, the cold filtered fish oil and water mixture is gently mixed together. Gentle mixing of the cold filtered fish oil and water mixture causes the residual soaps to dissolve into the water phase of the mixture. The elbows 606 allow gentle mixing of the cold filtered fish oil and water mixture without severe agitation or perturbations—and yet provide sufficient mixing so the residual soaps in the cold filtered fish oil will dissolve into the water phase. Agitation of the cold filtered fish oil increases the possibility of introducing oxygen into the cold filtered fish oil, which reduces fish oil stability. As shown in FIG. 6 the mixing loop valves 600 are normally open and the mixing loop bypass valves 602 are normally closed, thereby allowing cold filtered fish oil flow through the entire run of the mixing loop piping 604. However, when the process dictates, some or each mixing loop valve 600 can be closed and some or each mixing loop bypass valve 602 can be opened. The mixing time depends on the amount of residual soaps in the cold filtered fish oil; more residual soaps in the cold filtered fish oil will require a longer mixing/retention time and vice-versa. Opening each mixing loop bypass valve 602 when each mixing loop valve 600 is closed shortens the effective length of the mixing loop piping 604, thereby reducing the time the fish oil spends in the mixing/retention loop 410.

After exiting the mixing/retention loop 410 the cold filtered fish oil and water mixture is heated to a temperature of 175° F. to 190° F. by the fatty acid reduction heater 415. Since the residual soaps were dissolved in the water phase in the mixing/retention loop 410, the residual soaps and water can be removed from the cold filtered fish oil and water mixture by the secondary fatty acid centrifuge 420 (Alfa Laval, model BRPX 313.

Figure 5:
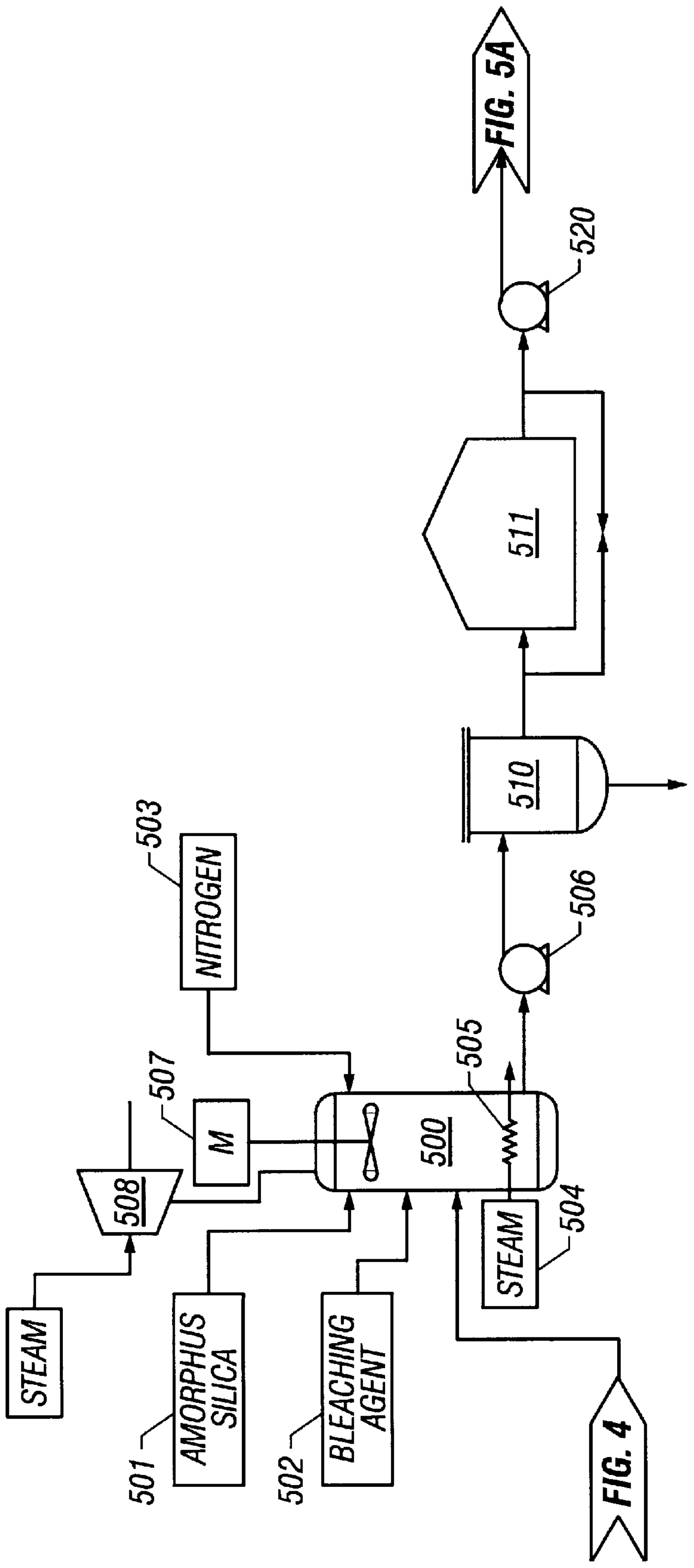
FIG. 5 is a process flow diagram representing the initial purification (bleaching) section of the present invention.
Figure 5A:
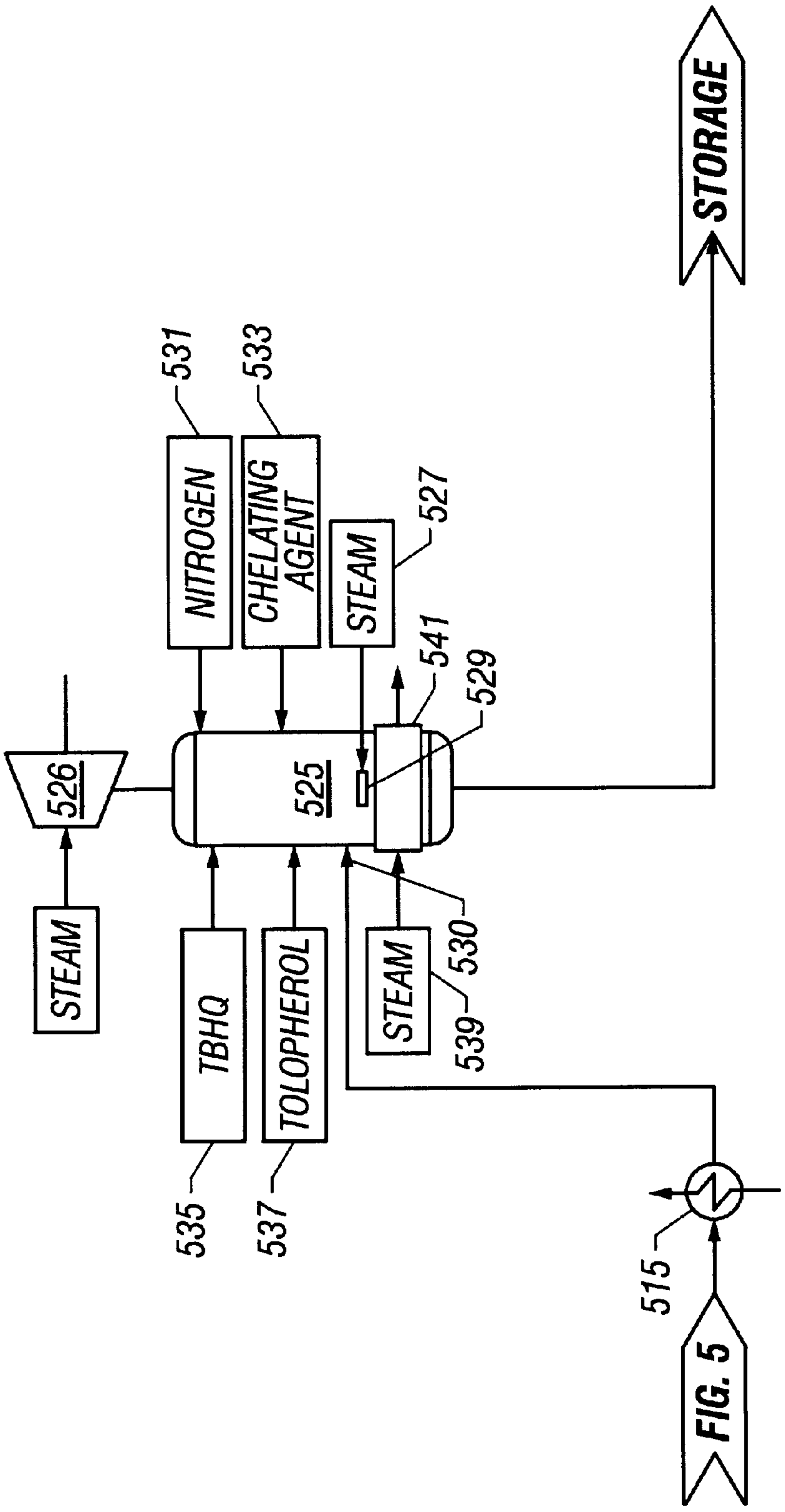
FIG. 5*a* is a process flow diagram representing the final purification section of the present invention.

The cold filtered fish oil is then subjected to a pre-deodorizing treatment in steps nine 140 and ten 145. Step nine involves bleaching the cold filtered fish oil inside the vacuum vessel 500 (FIG. 5) and then removing remaining impurities from the cold filtered fish oil. The cold filtered fish oil enters the vacuum vessel 500 after exiting the secondary fatty acid centrifuge 420. The pressure inside of the vacuum vessel is maintained at less than 50 mm Hg by the vacuum vessel ejector 508. Rice hull ash amorphous silica 501, (L.A. Solomon) containing 0 to 5% silica gel, is added to the cold filtered fish oil in an amount equal to 0.034% to 0.05% by weight of the cold filtered fish oil. The added silica absorbs residual impurities in the cold filtered fish oil, such as soaps, pigments, residual moisture and non-hydratable phospholipids. After 20 to 30 minutes retention/mixing time (vacuum vessel 500 includes a vessel mixer 507) a bleaching agent 502 is added to the cold filtered fish oil. The preferred bleaching agent 502 is bentonite powder at 4%–10% of the weight of the cold filtered fish oil. The bleaching agent 502, and more specifically bentonite powder, reacts with and deactivates compounds such as aldehydes, ketones, carotenoids, residual metals, and color bodies. These compounds can seed peroxidation of the fish oil and therefore must be reduced. Peroxidation, like oxidation, causes fish oil instability and promotes unsavory tastes and smells in the fish oil. After addition of the temperature of the fluid inside the vacuum vessel 500 is increased to 165° F. to 220° F., the most preferred temperature being 210° F. This temperature has been found to optimize the effect of the bleaching agent. The temperature inside of the vacuum vessel 500 is increased by flowing steam through the vacuum vessel steam coils 505. Steam is supplied to the vacuum vessel steam coils 505 via the vacuum vessel steam addition 504. Once the desired temperature has been attained inside of the vacuum vessel 500, the desired temperature is held constant and the pressure inside of the vacuum vessel 500 is maintained at a vacuum of less than 50 mm Hg for a retention period of 20 to 30 minutes. After the retention period has passed nitrogen is introduced into the vacuum vessel 500 through the vacuum vessel nitrogen addition 503. Prior to breaking the vacuum in the vacuum vessel 500 nitrogen is added to the vacuum vessel 500. It is important that the nitrogen be added to the vacuum vessel 500 above the oil level to blanket and protect the fish oil from oxygen. After the vacuum is broken the now bleached fish oil is pumped from the vacuum vessel 500 to the bleached oil filter 510 via the vacuum vessel pump 506.

Step ten 145 entails filtering and cooling the bleached fish oil. Filtration is performed with a bleached oil filter 510, the preferred construction of the bleached oil filter 510 is a closed gasketed filter of glass filled nylon construction (Eimco 900 FBCGR). While it is preferred that the bleached fish oil then be cooled and deodorized, the bleached fish oil can be stored in a bleached oil storage tank 511 after cooling. After filtering, the bleached fish oil is passed through the bleached oil cooler 515 where the bleached fish oil temperature is reduced to less than 120° F.

The bleached fish oil is vacuum distilled and deodorized in step eleven 150 to remove remaining components that produce unsavory taste and smell. The bleached fish oil is pumped by the bleached oil pump 520 to the steam distillation batch deodorizer 525. The steam distillation batch deodorizer 525 is maintained under a controlled vacuum, preferably of less than 3 mm Hg. The vacuum conditions inside of the steam distillation batch deodorizer 525 are achieved by use of the deodorizer ejector 526 whose functions thereof can easily be ascertained by one skilled in the art. The low pressure in the steam distillation batch deodorizer 525 provides for enhanced drying and de-aeration of the fish oil without the use of steam or heat prior to the distillation process. The distillation process is initiated by first increasing the temperature of the bleached fish oil to 125° F. then by injecting just enough steam through the steam sparger 529 to slightly agitate the bleached fish oil in the steam distillation batch deodorizer 525. The steam sparger 529 is located in the lower section of the steam distillation batch deodorizer 525 below the liquid level of the bleached fish oil. Steam is supplied to the steam sparger 529 from the steam sparger supply 527. The bleached fish oil temperature is increased by injecting steam through the deodorizer steam jacket 541. The steam to the deodorizer steam jacket 541 is supplied via the deodorizer steam addition 539 and increases the bleached fish oil temperature to 275° F. As soon as the bleached fish oil temperature reaches 275° F. the flow rate of steam from the steam sparger 529 is increased to a range of 30 pounds per hour to 60 pounds per hour. The combination of the steam sparge and vacuum conditions work to remove unwanted volatiles from the fish oil that produce the unsavory taste and smell. To ensure proper vacuum conditions inside of the steam distillation batch deodorizer 525 it is important that the steam flow rate from the steam sparger 529 not exceed 60 pounds per hour.

After the batch temperature inside of the steam distillation batch deodorizer 525 reaches 406° F., and the manifold 530 temperature reaches 410° F., the now deodorized fish oil in the steam distillation batch deodorizer 525 is then monitored for residual impurities. The residual impurities are measured by the free fatty acid content, anisidine number, and peroxide value. The deodorized fish oil in the steam distillation batch deodorizer 525 is cooled as soon as the free fatty acids are less than 0.08% by weight, the anisidine number is less than 6, and the peroxide value is equal to 0.0 meq/kg. When the manifold temperature is less than 250° F., residual metals in the deodorized fish oil are deactivated by adding chelating agent to the steam distillation batch deodorizer 525. The chelating agent is added via the chelating agent addition 533. The preferred chelating agent added is citric acid, in an amount equal to 50 ppm. Once the temperature of the deodorized fish oil in the steam distillation batch deodorizer 525 is less than 90° F., the anti-oxidants are added to the deodorized fish oil in the steam distillation batch deodorizer 525 to produce an edible quality refined fish oil. The preferred anti-oxidant addition consists of 200 parts per million of tertiary butyl hydroquinone (TBHQ—added per the TBHQ addition 535) and 1000 parts per million of mixed tocopherols (added per the tocopherol addition 537). The preferred mix of tocopherols is 50%. As noted above, since the aldehydes, ketones, carotenoids, residual metals, and color bodies were reduced by the bentonite powder the anti-oxidants are able to provide protection against subsequent oxidation and peroxidation.

The vacuum conditions inside of the steam distillation batch deodorizer 525 are broken by nitrogen addition through the deodorizer nitrogen addition 531. The vacuum is broken by nitrogen addition during step twelve while the edible quality refined fish oil is packaged for delivery.

It should be noted that another advantage of the above described process is that the process can be practiced on a production scale, pilot plant operations, and a bench test arrangement.

The present invention, therefore, is well adapted to carry out the objects and attain the ends and advantages mentioned, as well as others inherent therein. While a presently preferred embodiment of the invention has been given for purposes of disclosure, numerous changes in the details of procedures for accomplishing the desired results will readily suggest themselves to those skilled in the art, and which are encompassed within the spirit of the present invention disclosed herein and the scope of the appended claims.

What is claimed is:

1. A method for producing edible quality refined fish oil from cooked, pressed fish comprising the steps of:

extracting press liquor from said cooked fish, wherein said press liquor consists essentially of fish oil and water that is inherent in the cooked fish flesh;

lowering the pH of said press liquor by adding an acid to said press liquor;

separating said press liquor into a fish oil component and a water component, wherein said fish oil component contains of a homogenous mixture of stearine and olein;

monitoring the pH of said water component;

adjusting the flow of said acid to said press liquor to maintain a pH of less than 2 of said water component, wherein said acid addition deactivates enzymes present in said fish oil that encourage unsavory taste and smell of said fish oil;

filtering moisture and insoluble impurities from said fish oil;

chilling said fish oil component, without agitation, to crystallize said stearine, then filtering said olein from said stearine to produce a cold filtered fish oil;

removing free fatty acids from said cold filtered fish oil including the steps of:

mixing an aqueous alkali solution with said cold filtered fish oil to produce water soluble soaps from said fatty acids in the cold filtered fish oil;

extracting said water soluble soaps from said cold filtered fish oil;

injecting further water into said cold filtered fish oil to create a water and cold filtered fish oil mixture, wherein the temperature of said water is above the temperature of said cold filtered fish oil;

mixing gently said water and cold filtered fish oil mixture in a mixing/retention loop, wherein said fatty acids that remain in said cold filtered fish oil are dissolved in the water constituent of said water and cold filtered fish oil mixture; and separating said water constituent from said water and cold filtered fish oil mixture, thereby removing most of the fatty acids from said cold filtered fish oil;

bleaching said cold filtered fish oil in a vacuum vessel to produce a bleached fish oil including the steps of:

producing vacuum conditions inside of said vacuum vessel;

heating said cold filtered fish oil to a first elevated temperature;

mixing amorphous silica with said cold filtered fish oil;

mixing diatomaceous earth with said cold filtered fish oil;

heating said cold filtered fish oil to a second elevated temperature;

ceasing said vacuum conditions inside of said vacuum vessel by introducing an inert gas into the head space of said vacuum vessel; and filtering and cooling said now bleached fish oil; and deodorizing said bleached fish oil under vacuum conditions in a steam distillation batch deodorizer to produce an edible quality refined fish oil including the steps of:

heating said bleached fish oil to a first temperature increase then injecting steam into said steam distillation batch deodorizer at a low flow rate;

heating said bleached fish oil to a second temperature increase then increasing said steam flow rate into said steam distillation batch deodorizer to a rated flow rate, then heating said bleached fish oil to a third temperature increase;

monitoring said bleached fish oil for residual impurities;

determining when said residual impurities are at an acceptable level such that a deodorized fish oil has been produced, then cooling said deodorized fish oil to a first temperature decrease;

adding a chelating agent to said deodorized fish oil then cooling said deodorized fish oil to a second temperature decrease;

adding one or more anti-oxidants to said deodorized fish oil; and ceasing vacuum conditions in said steam distillation batch deodorizer by introducing an inert gas into said steam distillation batch deodorizer thereby producing an edible quality refined fish oil.

2. The method of claim 1 wherein said acid solution is comprised of food grade phosphoric acid at 85%.

3. The method of claim 1 wherein said aqueous alkali solution is comprised of sodium hydroxide.

4. The method of claim 1 wherein said water temperature added to said cold filtered fish oil is 10° F. above the temperature of said cold filtered fish oil.

5. The method of claim 1 wherein said vacuum conditions inside said vacuum vessel is between 20 mm Hg and 50 mm Hg.

6. The method of claim 1 wherein said amorphous silica is rice hull ash amorphous silica containing 0–5% by weight of silica gel.

7. The method of claim 1 wherein said diatomaceous earth is bentonite powder at 4–10% by weight of said cold filtered fish oil.

8. The method of claim 1 wherein said inert gas is nitrogen.

9. The method of claim 1 wherein said first elevated temperature is 145° F. to 150° F.

10. The method of claim 1 wherein said second elevated temperature is 165° F. to 220° F.

11. The method of claim 1 wherein said first temperature increase is 125° F.

12. The method of claim 1 wherein said second temperature increase is 275° F.

13. The method of claim 1 wherein said third temperature increase is 406° F.

14. The method of claim 1 wherein said residual impurities are determined by measuring members of the group selected from free fatty acid content, anisidine number, and peroxide value.

15. The method of claim 1 wherein said residual impurities are at an acceptable level when the free fatty acids are less than 0.08%, the anisidine number is less than 6, and the peroxide value is equal to 0.0.

16. The method of claim 1 wherein said first temperature decrease is less than 250° F.

17. The method of claim 1 wherein said chelating agent is 50 parts per million of citric acid.

18. The method of claim 1 wherein said second temperature decrease is less than 90° F.

19. The method of claim 1 wherein said one or more anti-oxidants comprise 200 parts per million tertiary butyl hydroquinone and 1000 parts per million of 50% mixed tocopherols.

20. The method of claim 1 wherein said insoluble impurities comprise dirt, meal, and foreign substances that do not dissolve in ether.

21. The method of claim 1 wherein said fish oil is extracted from fish being a member of the group consisting of menhaden, other similar fish and mixtures thereof.

22. The edible quality fish oil produced by the process of claim 1 wherein:

said refined fish oil is free of unsavory taste or smell;

said refined fish oil has an anisidine number of less than 6; and said refined fish oil contains more than 98% of the total long chain omega-3 fatty acids present in the fish oil prior to said process.

23. A method for producing fish oil comprising the steps of:

extracting press liquor from a cooked fish, wherein said press liquor consists primarily of fish oil and water inherent in the cooked fish;

deactivating enzymes present in said press liquor by injecting an acidic solution into said press liquor;

removing said fish oil from said press liquor;

cold filtering said fish oil to produce an olein fraction and a stearine fraction;

separating said olein fraction from said stearine fraction;

removing free fatty acids from said olein fraction to form a cold filtered fish oil;

bleaching said filtered fish oil by mixing amorphous silica and diatomaceous earth with said fish oil, under vacuum conditions; and deodorizing said fish oil under vacuum conditions with steam injection then mixing a chelating agent and anti-oxidants with said fish oil to produce an edible quality refined fish oil.

24. The method of claim 23 wherein said fish oil is extracted from fish being a member of the group consisting of menhaden, other similar fish, and mixtures thereof.

25. An edible quality refined fish oil produced by a process wherein:

said refined fish oil is free of unsavory taste or smell said refined fish oil has an anisidine number of less than 6; and said refined fish oil contains more than 98% of the total long chain omega-3 fatty acids present in the fish oil prior to said process.

26. A method of deactivating enzymes present in fish oil that produce unsavory tastes and smells comprising the steps of:

extracting press liquor from cooked fish, wherein said press liquor consists essentially of fish oil and water that is inherent in the cooked fish flesh;

lowering the pH of said press liquor by adding an acid to said press liquor;

separating said press liquor into a fish oil component and a water component, wherein said fish oil component contains a homogenous mixture of stearine and olein;

monitoring the pH of said water component; and adjusting the flow of said acid to said press liquor to maintain a pH of less than 2 of said water component, wherein said acid addition deactivates enzymes present in said fish oil that encourage unsavory taste and smell of said fish oil.

27. The method of claim 26 wherein said acid solution is comprised of food grade phosphoric acid at 85%.

* * * * *